(12) United States Patent
Ruffa

(10) Patent No.: US 10,095,248 B1
(45) Date of Patent: Oct. 9, 2018

(54) METHOD FOR SPATIALLY CONFINING VIBRATIONAL ENERGY

(71) Applicant: Anthony A Ruffa, Hope Valley, RI (US)

(72) Inventor: Anthony A Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 106 days.

(21) Appl. No.: 15/344,754

(22) Filed: Nov. 7, 2016

Related U.S. Application Data

(60) Provisional application No. 62/253,365, filed on Nov. 10, 2015.

(51) Int. Cl.
| | | |
|---|---|---|
| *G05D 19/02* | (2006.01) | |
| *B06B 1/02* | (2006.01) | |
| *E04C 3/02* | (2006.01) | |
| *G05B 17/02* | (2006.01) | |

(52) U.S. Cl.
CPC ........... *G05D 19/02* (2013.01); *B06B 1/0207* (2013.01); *E04C 3/02* (2013.01); *G05B 17/02* (2013.01)

(58) Field of Classification Search
CPC .............................. G05D 19/02; B06B 1/0207
See application file for complete search history.

(56) References Cited

U.S. PATENT DOCUMENTS

| | | | | |
|---|---|---|---|---|
| 2004/0267407 A1* | 12/2004 | Ogura | ................... | F16F 15/223 700/280 |
| 2007/0114799 A1* | 5/2007 | Riesberg | ................. | F03D 13/20 290/55 |
| 2009/0142178 A1* | 6/2009 | Nieuwenhuizen | .... | E04H 12/085 415/2.1 |
| 2010/0030384 A1* | 2/2010 | Kraner | .................... | F16F 15/02 700/280 |
| 2010/0211225 A1* | 8/2010 | Heiland | ................ | F16F 15/002 700/280 |
| 2012/0226414 A1* | 9/2012 | Tomizaki | .............. | F16F 15/002 701/36 |
| 2014/0121844 A1* | 5/2014 | Ryaboy | ................... | F16F 15/02 700/280 |
| 2015/0003984 A1* | 1/2015 | Pineda Amo | ......... | F03D 7/0296 416/1 |

* cited by examiner

*Primary Examiner* — Vincent H Tran
(74) *Attorney, Agent, or Firm* — James M. Kasischke; Michael P. Stanley

(57) ABSTRACT

A method for isolating vibrations from a source on a structure includes modeling the structure as a beam having a portion for isolation. A sensor is positioned proximate to the source, and at least one actuator is positioned on the structure between the source and the portion for isolation. A controller receives signals from the sensor and calculates vibrational inputs for each actuator that will isolate the structure portion. Driving signals are provided to each actuator by the controller in response to the calculated vibrational inputs, and each actuator is vibrated accordingly, isolating the structure portion from the source. This method can be implemented in multiple configurations to isolate the structure portion.

13 Claims, 7 Drawing Sheets

METHOD FOR SPATIALLY CONFINING VIBRATIONAL ENERGY

CROSS REFERENCE TO OTHER PATENT APPLICATIONS

This patent application claims priority to U.S. Patent Application Ser. No. 62/253,365, "A Method to Spatially Confine Vibrational Energy" filed on 10 Nov. 2015.

STATEMENT OF GOVERNMENT INTEREST

The invention may be manufactured and used by or for the Government of the United States of America for governmental purposes without the payment of any royalties thereon or therefor.

BACKGROUND OF THE INVENTION

(1) Field of the Invention

The present invention is directed to a method to confine vibrational energy within a physical structure and more particularly to a method to confine vibrational energy to a beam having various end conditions.

(2) Description of the Prior Art

There has been a considerable amount of work focusing on vibration confinement in flexible structures. It is known to localize individual longitudinal vibration modes utilizing a tridiagonal system with two control sensor/actuator pairs; however, the required number of pairs increases with the system bandwidth (i.e., the number of diagonals in the coefficient matrix). Vibration in a beam leads to a pentadiagonal matrix (i.e., having five diagonals) when modeled using the finite difference method.

FIG. 1 illustrates a common vibration confinement problem. This involves isolation of a vibration source 10 on a beam 12. Source 10 vibrates in a direction shown by arrow 14. Beam 12 has simply supported end conditions 16A and 16B. The magnitude of vibrations is given by the x coordinate and the distance along the beam is given by the s coordinate. First end 16A is at s=0 and has a vibration magnitude of $x_0$. Second end 16B is at s=S and has vibration magnitudes of $x_{n+1}$, where n is the maximum finite difference node index. (Since $x_0=x_{n+1}=0$ for the cases considered here, the vibration amplitude at nodes 0 and n+1 are not modeled.) In this isolation problem, it is desirable to prevent vibrations created by source 10 from reaching a specified region between source 10 and end 16A or 16B.

FIG. 2 is a graph of relative vibrations along beam 12 when subjected to vibrations from source 10 without modification. In the examples utilized herein, beam 12 is modeled utilizing finite difference modeling as a series of 3901 nodes. The node index is used as the s coordinate. Source is positioned at node 1951.

Thus, there is a need for a technique for computing isolating active vibration that only requires an actuator for each support. It is also desirable to have a technique for isolating broadband vibration from a specified region between the source and the end of a beam.

SUMMARY OF THE INVENTION

It is a first object of the present invention to provide a method for isolating portions of a structure from vibrations.

Another object is to provide the isolation method in real time utilizing sensor inputs.

Yet another object is to provide such isolation by using a minimum number of actuators.

Accordingly, there is provided a method for isolating vibrations from a source on a structure that includes modeling the structure as a beam having a portion for isolation. The source can represent a single load applied to a single finite difference node, or an arbitrary number of load terms applied to multiple finite difference nodes. In the latter case, the load distribution can be arbitrary in general. A sensor is positioned proximate to the source, and at least one actuator is positioned on the structure between the source and the portion for isolation. A controller receives signals from the sensor and calculates vibrational inputs for each actuator that will isolate the structure portion. Driving signals are provided to each actuator by the controller in response to the calculated vibrational inputs, and each actuator is vibrated accordingly, isolating the structure portion from the source. This method can be implemented in multiple configurations to isolate the structure portion, and the structure can have various end conditions.

BRIEF DESCRIPTION OF THE DRAWINGS

Reference is made to the accompanying drawings in which are shown an illustrative embodiment of the invention, wherein corresponding reference characters indicate corresponding parts, and wherein.

DETAILED DESCRIPTION OF THE INVENTION

The vibration of a beam is governed by the Euler-Bernoulli equation, i.e.:

$$EI\frac{\partial^4 x}{\partial s^4} + \rho A\frac{\partial^2 x}{\partial t^2} = w. \quad (1)$$

Here E is the Young's modulus for the beam, I is the moment of inertia, $\rho$ is the density, A is the cross-sectional area, w is the applied load at the source, s and t are the independent spatial and temporal coordinates, respectively, and x is the transverse dis-placement. When the load w has a periodic time dependence at a known location s, a harmonic time dependence can be assumed, $x(s,t)=x(s)e^{i\omega t}$. A finite difference approximation is used for the spatial derivatives:

$$\frac{\partial^4 x}{\partial s^4} \approx \frac{x_{n-2} - 4x_{n-1} + 6x_n - 4x_{n+1} + x_{n+2}}{\Delta s^4} \quad (2)$$

This leads to $$\frac{x_{n-2} - 4x_{n-1} + 6x_n + 4x_{n+1} + x_{n+2}}{\Delta s^4} - \frac{\omega^2 \rho A}{EI} x_n = 0 \quad (3)$$

Figure 1:
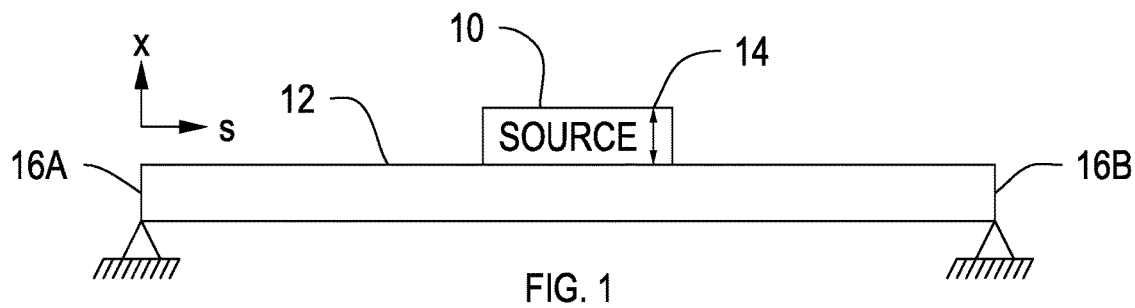
FIG. 1 is a diagram of a modeled structure.

In the example of FIG. 1, beam 12 is pinned on both ends 16A and 16B and cannot move vertically, this leads to the following boundary conditions:

$$x_0 = 0 \quad (4)$$

$$\frac{d^2 x_0}{ds^2} \approx \frac{2x_0 - 5x_1 + 4x_2 - x_3}{\Delta s^2} = 0 \quad (5)$$

$$x_{n+1} = 0 \quad (6)$$

$$\frac{d^2 x_{n+1}}{ds^2} \approx \frac{2x_{n+1} - 5x_n + 4x_{n-1} - x_{n-2}}{\Delta s^2} = 0 \quad (7)$$

Equation (3) represents a banded Toeplitz system (except for the first and last equations) with a row structure of $[1,-4,6+\gamma,-4,1]$, where $\gamma=-\omega^2\rho A\Delta s^4/(EI)$. An analytical solution can be written as follows:

$$x_k = Ae^{\sigma k} + Be^{-\sigma k} + C\cos(\sigma k) + D\sin(\sigma k) \quad (8)$$

Where $\sigma=\gamma^{1/4}$. Denoting (3) as $ax=b$, the coefficient matrix a is:

$$\begin{bmatrix} -5 & 4 & -1 & 0 & \cdots & \cdots & \cdots & \cdots & \vdots \\ -4 & 6+\gamma & -4 & 1 & 0 & \ddots & \ddots & \ddots & \vdots \\ 1 & -4 & 6+\gamma & -4 & 1 & 0 & \ddots & \ddots & \vdots \\ 0 & 1 & -4 & 6+\gamma & -4 & 1 & 0 & \ddots & \vdots \\ \vdots & 0 & 1 & -4 & 6+\gamma & -4 & 1 & 0 & \ddots \\ \vdots & \vdots & \vdots & \vdots & \vdots & \vdots & \vdots & \vdots & \vdots \\ \vdots & \ddots & \ddots & \ddots & 1 & -4 & 6+\gamma & -4 & 1 & 0 \\ \vdots & \ddots & \ddots & \ddots & 0 & 1 & -4 & 6+\gamma & -4 & 1 \\ \vdots & \ddots & \ddots & \ddots & \ddots & 0 & 1 & -4 & 6+\gamma & -4 \\ 0 & \cdots & \cdots & \cdots & \cdots & \cdots & 0 & -1 & 4 & -5 \end{bmatrix} \quad (9)$$

Figure 2:
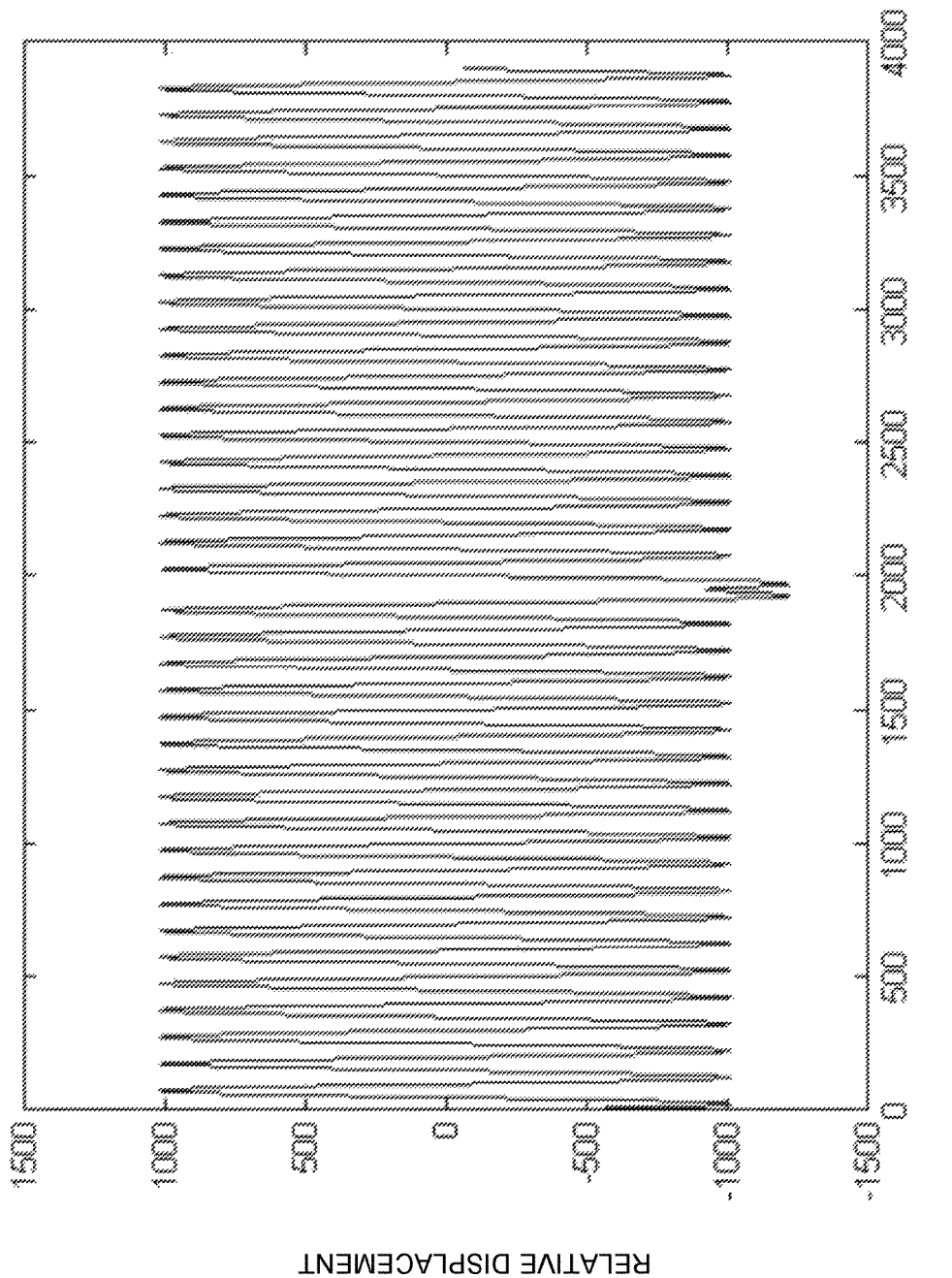
FIG. 2 is a graph of vibrational effects on the modeled structure of FIG. 1.

Consider the case of a square beam with a length of 0.1 meter on each side and vibrating at 100 Hz. The finite difference discretization length is $\lambda/100$ (where $\lambda$ is the wavelength of the vibration in the beam), and n=3901, so the beam effectively contains 39 wavelengths. The load vector is zero except for the term $b_m$, where m=1951 (i.e., at the center of the beam). As described above, FIG. 2 shows the resulting solution for this loading of the beam of FIG. 1

The forward and backward substitution technique for solution of tridiagonal systems can be expanded for use with the pentadiagonal system used here. This is best illustrated with the exemplary tridiagonal Toeplitz system for a longitudinal vibrational system having row structure as given below:

$$\begin{bmatrix} -2 & 1 & 0 & 0 & \cdots & \cdots & \cdots & \cdots & \cdots & 0 \\ 1 & -2 & 1 & 0 & 0 & \ddots & \ddots & \ddots & \ddots & \vdots \\ 0 & 1 & -2 & 1 & 0 & 0 & \ddots & \ddots & \ddots & \vdots \\ 0 & 0 & 1 & -2 & 1 & 0 & 0 & \ddots & \ddots & \vdots \\ \vdots & 0 & 0 & 1 & -2 & 1 & 0 & 0 & \ddots & \vdots \\ \vdots & \vdots & \vdots & \vdots & \vdots & \vdots & \vdots & \vdots & \vdots & \vdots \\ \vdots & \ddots & \ddots & \ddots & 0 & 1 & -2 & 1 & 0 & 0 \\ \vdots & \ddots & \ddots & \ddots & 0 & 0 & 1 & -2 & 1 & 0 \\ \vdots & \ddots & \ddots & \ddots & 0 & 0 & 1 & -2 & 1 \\ 0 & \cdots & \cdots & \cdots & \cdots & \cdots & 0 & 0 & 1 & -2 \end{bmatrix} \quad (10)$$

Consider equation (10) with n=3901 and a single nonzero load term, $b_m=1$, where m=1951. Such a system represents the coefficient matrix for the finite difference approximation to Laplace's equation in one dimension.

The forward substitution process applied to the system having the coefficient matrix in equation (10) begins by assuming $x_1=1$ and solves for $x_2$ using the first equation:

$$-2x_1 + x_2 = 0 \quad (11)$$

Next, $x_3$ is determined with the second equation:

$$x_1 - 2x_2 + x_3 = 0 \quad (12)$$

The forward substitution process is continued using each successive equation to find $x_k$ for $1 \leq k \leq 1951$ until $x_{1951}$ is determined with the equation:

$$x_{1949} - 2x_{1950} + x_{1951} = 0. \quad (13)$$

Similarly, backward substitution begins by assuming $x_{3901}=1$ and then using each successive equation to find $x_k$ for $3901 \geq k \geq 1951$ until $x_{1951}$ is determined with the equation:

$$x_{1951} - 2x_{1952} + x_{1953} = 0. \quad (14)$$

Next, the solutions are scaled so that $x_{1951}$ found by forward and backward substitution are equal. This can be done since the load vector is zero for $1 \leq k \leq m-2$ and $m+2 \leq k \leq n$. This leaves the equation:

$$x_{1950} - 2x_{1951} + x_{1952} = B_m. \quad (15)$$

The term $B_m$ is found from (15), and then the entire solution is scaled by the factor $b_m/B_m$ to obtain the solution.

Figure 3A:
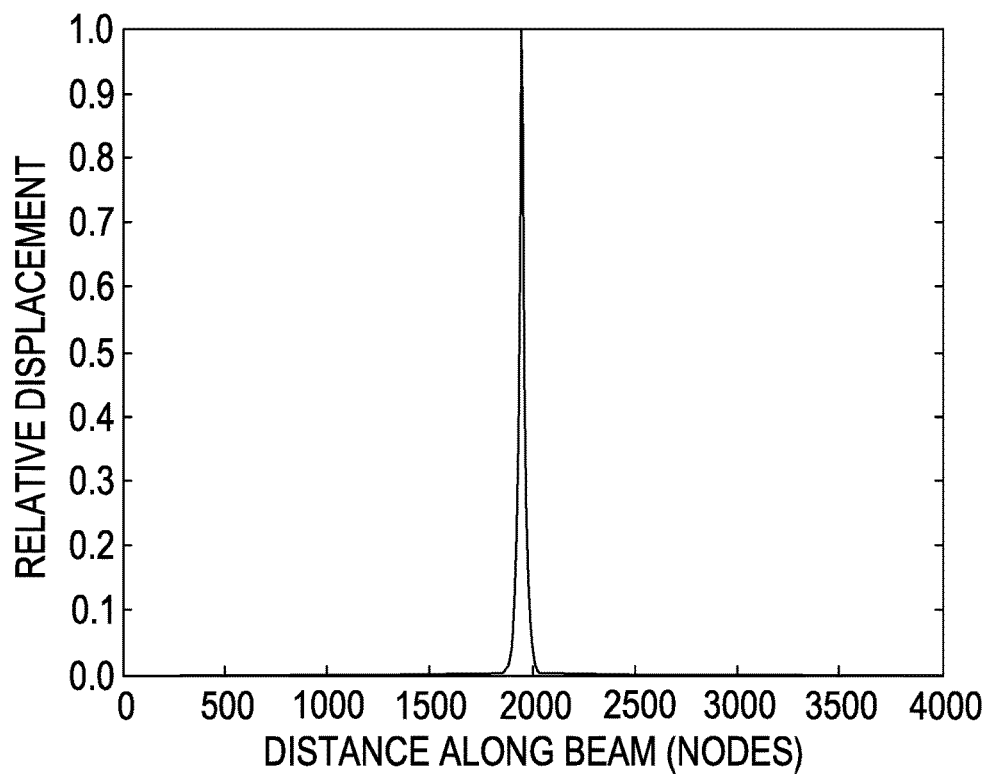
FIG. 3A is a graph showing vibrational effects on a modeled structure utilizing a simplified embodiment.

Extending the forward and backward substitution approach to the pentadiagonal beam problem leads to the result shown in FIG. 3A. The $e^{\sigma k}$ and $e^{-\sigma k}$ terms in equation (8) dominate the solution for large systems. There are three remaining equations:

$$x_{1948} - 4x_{1949} + (6+\gamma)x_{1950} - 4x_{1951} + x_{1952} = B_{1950}; \quad (16)$$

$$x_{1949} - 4x_{1950}(6+\gamma)x_{1951} - 4x_{1952} + x_{1953} = B_{1951}; \text{ and} \quad (17)$$

$$x_{1950} - 4x_{1951} + (6+\gamma)x_{1952} - 4x_{1953} + x_{1954} = B_{1952}. \quad (18)$$

Equations (16)-(18) lead to $B_{1951}=0.2510$ and $B_{1950}=B_{1952}=-0.1257$. This load is shown on FIG. 3B. Note that the node reference label has been changed to focus in on the added terms. The calculated error indicates that this is an accurate solution. $B_{1950}=B_{1952}\neq 0$ leads to the evanescent response, and in any case actuation at these points would be difficult to implement, since the terms are only spaced by a hundredth of a wavelength; therefore, a different approach is needed for the beam problem to effectively contain vibrations within a region of the beam.

It is possible to create a solution so that $x_k \neq 0$ in general for a limited range of values of k, and $x_k=0$ otherwise. For example, introducing dynamic load terms at k=1751 and k=2151 leads to $x_k \neq 0$ for $1751 \leq k \leq 2151$, and $x_k=0$ for all other values of k. These load terms represent the load terms required at k=1751 and k=2151 required to provide a confined vibrational energy state in the structure. Consider the following equation:

$$x_{1749} - 4x_{1750} + (6+\gamma)x_{1751} - 4x_{1752} + x_{1753} = B_{1751}. \quad (19)$$

The presence of $b_{1751}$ supports setting $x_k=0$ for $k \leq 1752$ by setting $x_{1753}=b_{1751}$. Likewise, $x_{2149}=b_{2151}$, so that $x_k=0$ for $k \geq 2150$ using the following equation:

$$x_{2149} - 4x_{2150} + (6+\gamma)x_{2151} - 4x_{2152} + x_{2153} = B_{2151}. \quad (20)$$

Forward substitution is then performed for $1751 \leq k \leq 1951$ and backward substitution is performed for $1951 \leq k \leq 2151$. These two solutions are then matched at k=m=1951. However, two independent solutions are needed for both $1751 \leq k \leq m$ and $m \leq k \leq 2151$. The second solution is developed with a forward solution for $1 \leq k \leq m$ generated with a zero load vector. This is an exponentially growing solution; however, it can be scaled and subtracted with the forward confined solution to produce a second forward solution that is independent of the first. This can be done since the load vector corresponding to the second solution is zero. A similar procedure can develop an independent back solution.

Figure 3B:
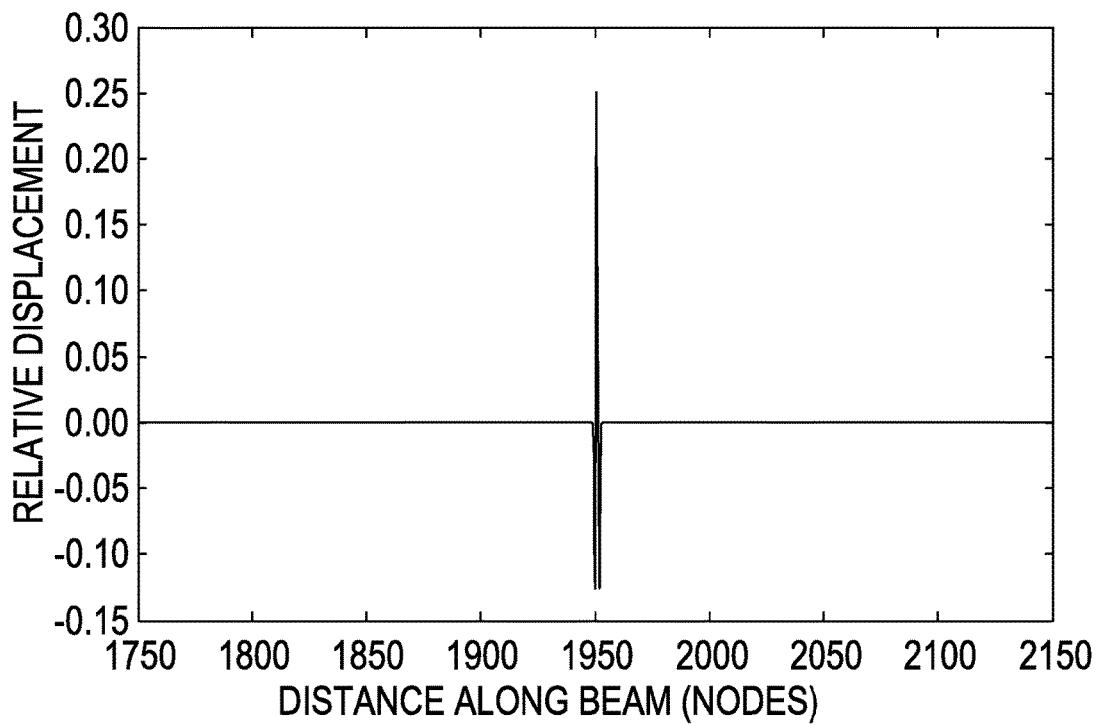
FIG. 3B is a graph of the load inputs for the practical embodiment.

The solutions represented by FIGS. 3A and 3B (obtained by forward and backward substitution of the system having a coefficient matrix represented by equation (9) and load terms that are the subsequent solution of equations (16)-(18)) are superimposed with these two solutions to obtain two independent forward and back solution vectors, i.e., $f^1$, $f^2$, and $b^1$ and $b^2$. A set of four equations are then developed to match the forward and back solutions. The four unknowns are $\alpha_1$, $\alpha_2$, $\beta_1$, and $\beta_2$, which govern the contributions of the forward and back solutions of $f^1$, $f^2$, and $b^1$ and $b^2$. The equations are as follows:

$$\alpha_1 f_{1951}^1 + \alpha_2 f_{1951}^2 = \beta_1 b_{1951}^1 + \beta_2 b_{1951}^2; \quad (21)$$

$$\alpha_1 f_{1948}^1 + \alpha_2 f_{1948}^2 - 4(\alpha_1 f_{1949}^1 + \alpha_2 f_{1949}^2) + (6+\gamma)(\alpha_1 f_{1950}^1 + \alpha_2 f_{1950}^2) - 4(\beta_1 b_{1951}^1 + \beta_2 b_{1951}^2) + \beta_1 b_{1952}^1 + \beta_2 b_{1952}^2 = 0; \quad (22)$$

$$\alpha_1 f_{1949}^1 + \alpha_2 f_{1949}^2 - 4(\alpha_1 f_{1950}^1 + \alpha_2 f_{1950}^2) + (6+\gamma)(\alpha_1 f_{1951}^1 + \alpha_2 f_{1951}^2) - 4(\beta_1 b_{1952}^1 + \beta_2 b_{1952}^2) + \beta_1 b_{1953}^1 + \beta_2 b_{1953}^2 = b_{1951}; \text{ and} \quad (23)$$

$$\alpha_1 f_{1950}^1 + \alpha_2 f_{1950}^2 - 4(\alpha_1 f_{1951}^1 + \alpha_2 f_{1951}^2) + (6+\gamma)(\alpha_1 f_{1952}^1 + \alpha_2 f_{1952}^2) - 4(\beta_1 b_{1953}^1 + \beta_2 b_{1953}^2) + \beta_1 b_{1954}^1 + \beta_2 b_{1954}^2 = 0. \quad (24)$$

Figure 4A:
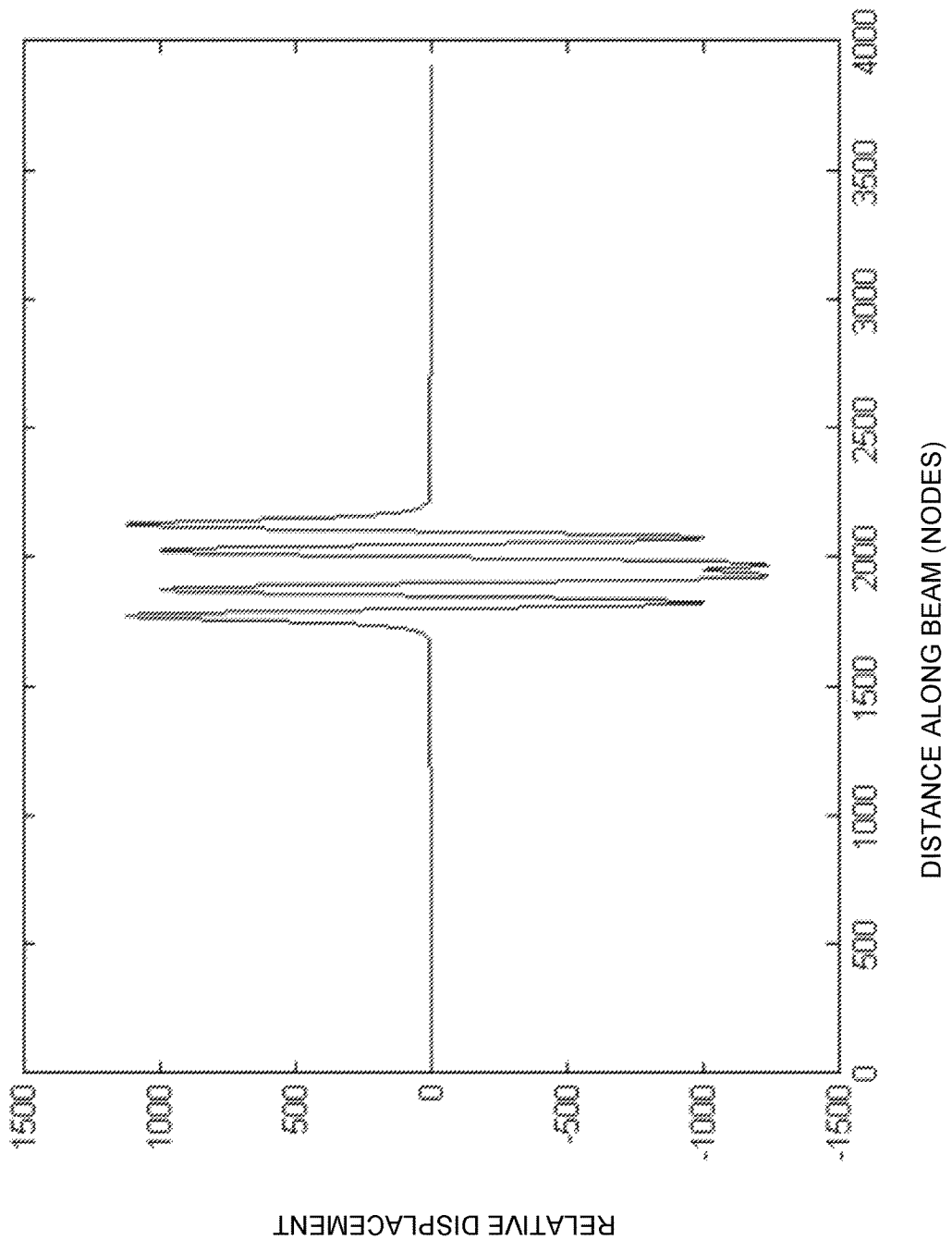
FIG. 4A is a graph showing vibrational effects on the modeled structure utilizing a realistic embodiment.
Figure 4B:
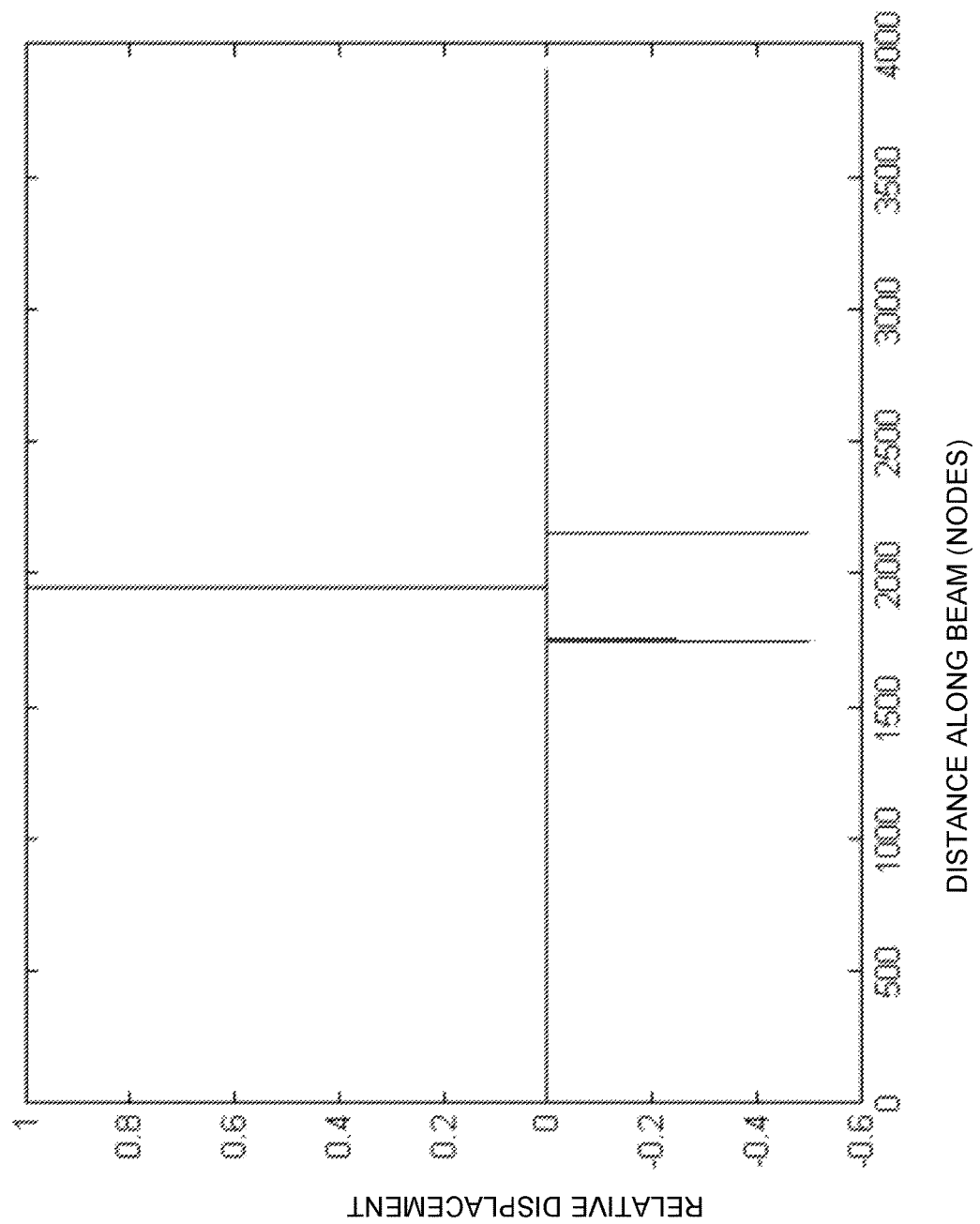
FIG. 4B is a graph of the load inputs for the practical embodiment.

This leads to the solution FIG. 4A and the associated source terms FIG. 4B. As can be seen from FIG. 4A, displacements are contained between node 1751 and 2151. FIG. 4B shows relative magnitude and positioning of the original load and two additional loads at these nodes.

Since the load source terms can be introduced anywhere in the system, it follows that vibrational energy can be confined to a chosen region on the beam by this approach. This approach is general in nature and can be extended to two dimensional and three dimensional problems. The number of introduced sources will be N=(BW−1)/2, where BW is the bandwidth of the coefficient matrix. There are some physical limitations on this. It is noted that by applying these new load terms, energy in the beam is being confined to a shorter length of beam, resulting in greater deflections in the shorter beam length. If the vibration amplitude becomes great enough so that it becomes nonlinear, then this technique cannot be fully effective because it is based on solutions to the Euler-Bernoulli equation, which assumes linear vibrations.

Figure 5:
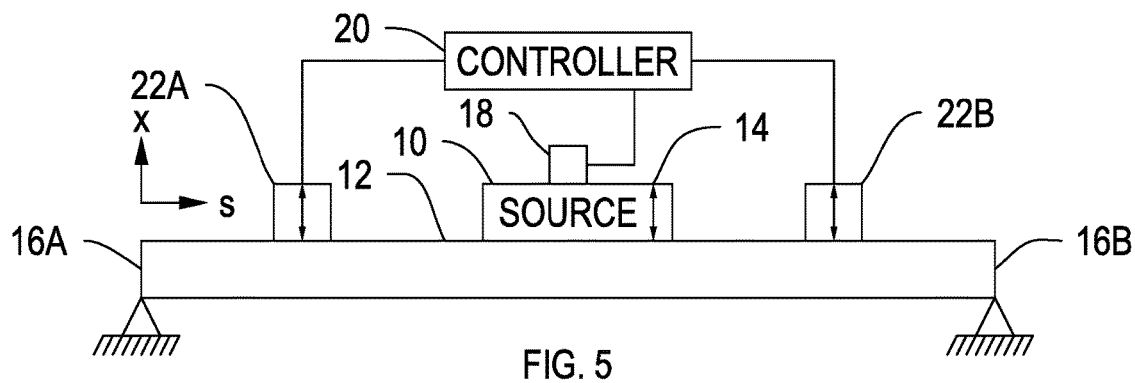
FIG. 5 is diagram of a modeled structure for practice of one embodiment.

FIG. 5 shows an embodiment for confining a vibration to a region in the center of a beam. Of course, this is applicable to other structures that can be modeled as beams. To build an apparatus based on these principles, a sensor 18 on beam 12 is used to detect vibrations 14 of noise source 10. Sensor 18 can be an accelerometer or any other sensor capable of measuring vibrations 14. Sensor 18 provides data to a controller 20. Controller 20 is joined to actuators 22A and 22B. Actuators 22A and 22B are joined to beam 12 to provide vibrational loading at the actuator's mounting position on beam 12. To simulate the finite difference model, actuators 22A and 22B should apply loads to the beam with a small spatial extent. For the case presented here, each finite difference node is associated with a spatial extent of $\lambda/100$ where $\lambda$ is an estimated wavelength of the applied load. The width of each confining actuator probe in contact with the beam should not exceed this width. Controller 20 receives vibration signal 14 from sensor 18 and utilizes signal 14 with beam model as described above for calculating output signals to actuators 22A and 22B. Actuators 22A and 22B provide vibrational loading in combination with that provided by source 10 that will result in vibrations being contained in beam 12 between the location of actuator 22A and that of actuator 22B.

Figure 6:
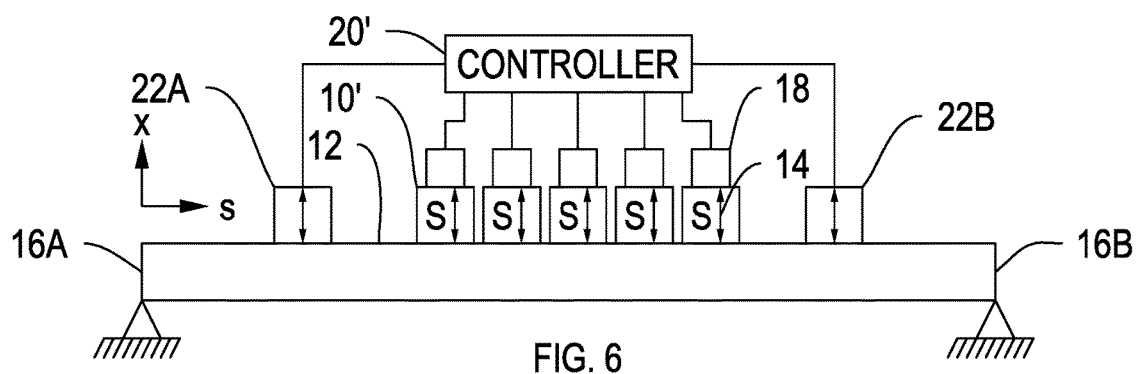
FIG. 6 is a diagram of a second modeled structure for practice of another embodiment.

FIG. 6 provides an alternate embodiment having multiple sources 10'. Each source 10' is at a known position s and has an associated vibrational loading 14'. A sensor 18 is associated with each source 10'. Controller 20' utilizes a beam model to calculate signals for actuators 22A and 22B that will result in vibrations being contained in the region of beam 12 between actuator 22A and actuator 22B.

Figure 7:
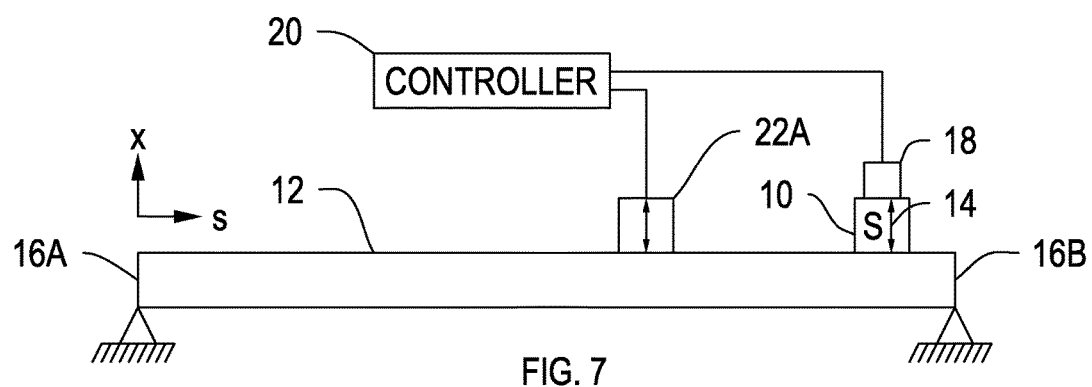
FIG. 7 is a diagram of a third modeled structure for practice of a third embodiment.
Figure 8A:
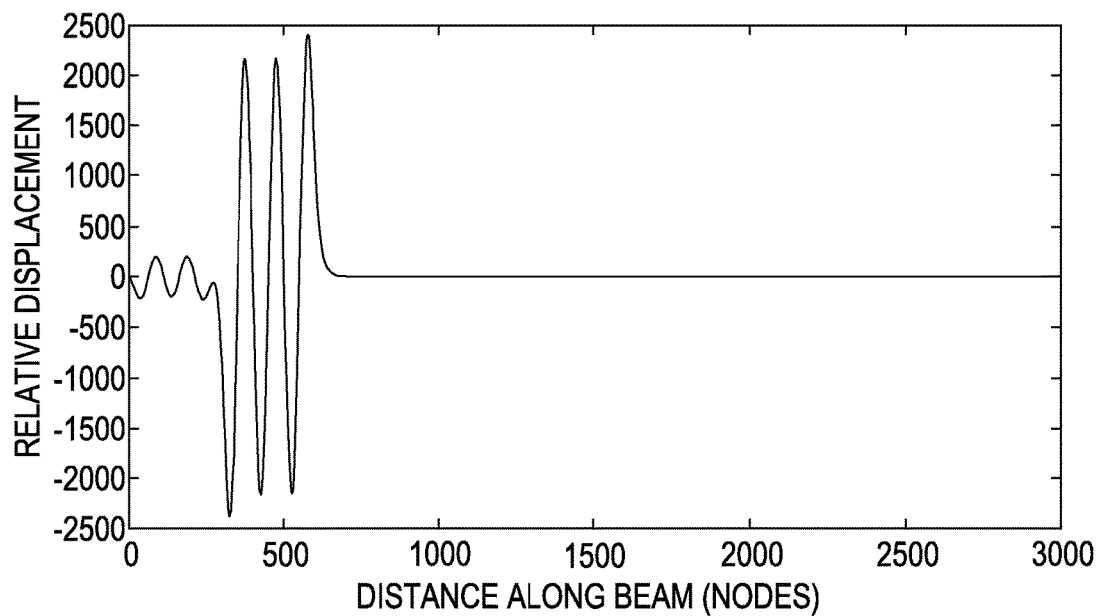
FIG. 8A is a graph showing vibrational effects on the modeled structure utilizing one actuator as in FIG. 7.
Figure 8B:
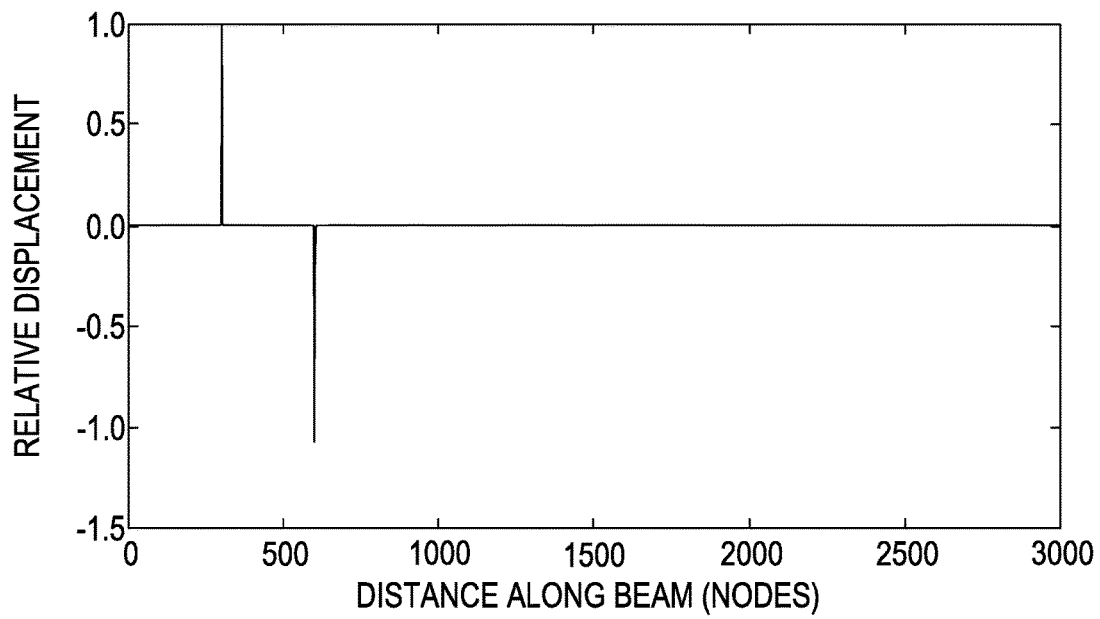
FIG. 8B is a graph of the load inputs for the embodiment utilizing one actuator shown in FIG. 7.

FIG. 7 provides a third embodiment having a single source 10 but only one actuator 22A. In this embodiment, actuator 22A blocks vibrations from propagating to end 16A while vibrations are free to propagate to end 16B. Controller 20 receives a vibrational signal 14 from sensor 18 positioned at source 10. Controller 20 utilizes this signal with a predetermined beam model to calculate a blocking vibrational load signal which is provided to actuator 22A. Vibrations 14 are blocked from the region of beam 12 between end 16A and actuator 22A location. End 16B is subjected to the resulting vibrations from source 10 and actuator 22A. The solution is given in FIG. 8A for the load terms shown in FIG. 8B.

In the example the noise sources all had the same phase, so all of the load terms were real. This will not be true in general, which will mean that the introduced load terms will be complex, each will have a computed amplitude and phase.

Note that each set of noise sources can be isolated individually or all of them can be isolated with just two introduced sources, as long as the vibrations are linear (so that superposition holds). Although just using two introduced sources is simpler, multiple sets of introduced sources may lead to better results (i.e., by isolating multiple regions individually rather than isolating all the sources as a single larger region) when the noise sources that need to be suppressed are distributed over most of the beam.

An extension of the procedure can suppress noise sources on a shell, which is a two dimensional extension of a beam. In this case, the noise sources to be isolated are then measured with accelerometers and the results are put into a model. Sources are then introduced in the banded matrix that will surround the noise sources. The amplitude and phase of the introduced sources will again be computed that will isolate the noise sources.

The principal advantage is the ability to confine vibrational energy to any region on a beam by introducing two source terms whose values are calculated by this approach. This can be useful in sonar and other acoustic applications to isolate and remove self-noise due to machinery and other sources.

Although the example here focused on beam vibration, this approach will work on any system that leads to a banded coefficient matrix. For example, it will work for one, two, and three dimensional vibrational problems, as well as any other system that can be modeled with a partial differential equation via a numerical approach (e.g., finite differences or finite elements) that leads to a banded coefficient matrix.

Figure 9:
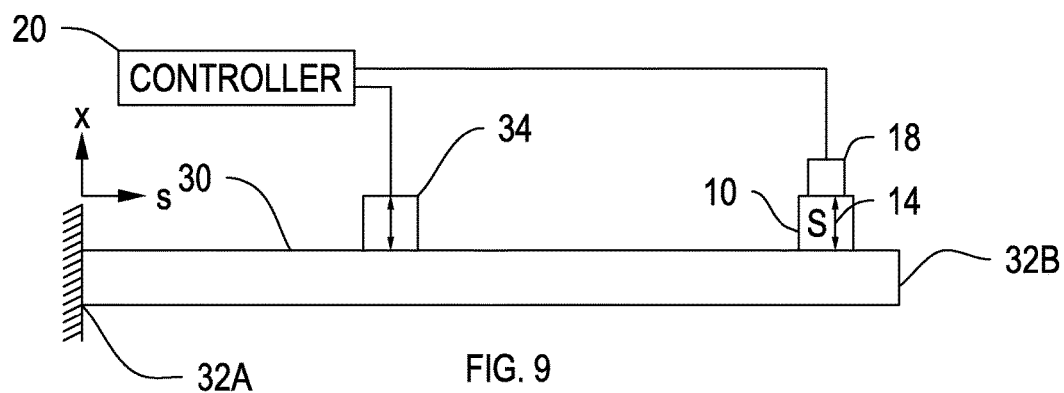
FIG. 9 is a diagram of a modeled structure utilizing a cantilevered beam.

FIG. 9 shows application of this technique to a cantilevered beam 30 having a cantilevered end 32A and a distal end 32B. A vibration source 10 is positioned proximate distal end 32B. Vibration source 10 provides a vibration loading 14. A sensor 18 detects vibrational loading 14 and provides a sensor signal to controller 20. Controller 20 calculates a blocking vibration signal from the received vibration loading signal and a predetermined model of the cantilevered beam 30, as described above. Blocking vibration signal is provided to actuator 34 in communication with controller 20. Vibrational loading from actuator 34 blocks vibrations from source 10 from reaching cantilevered end 32A of beam 30.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive, nor to limit the invention to the precise form disclosed; and obviously, many modification and variations are possible in light of the above teaching. Such modifications and variations that may be apparent to a person skilled in the art are intended to be included within the scope of this invention as defined by the accompanying claims.

What is claimed is:

1. A method for isolating vibrations from a source on a structure:
   modeling the structure as a beam having a portion for isolation by dividing the structure into nodes, and developing a pentadiagonal matrix representing displacements of the structure at each node responsive to vibrational loads provided at particular nodes of the structure;
   positioning a sensor proximate to the source;
   positioning at least one actuator on the structure between the source and the portion for isolation;
   receiving signals from the sensor at a controller;
   calculating vibrational inputs for each at least one actuator that will result in no vibration in the portion for isolation utilizing received signals from the sensor and the structure model;
   providing driving signals responsive to the calculated vibrational inputs from the controller to each at least one actuator; and
   vibrating each at least one actuator in response to the first and second driving signals.

2. The method of claim 1 wherein the step of calculating vibrational inputs comprises:
   representing vibrations from the source as vibrations at a particular node;
   representing vibrations from said at least one actuator as vibrations at a particular node; and
   utilizing the calculated pentadiagonal matrix to calculate vibrational inputs for each at least one actuator.

3. The method of claim 1 wherein the step of modeling the structure as a beam models the structure as a beam having a first end and a second end where each end is simply supported.

4. The method of claim 1 wherein the step of modeling the structure as a beam models the structure as a beam having at least one cantilevered end.

5. The method of claim 1 wherein the source includes multiple sources and the sensor includes multiple sensors with one sensor positioned at each of the multiple sources.

6. The method of claim 1 further comprising the step of estimating a source vibration wavelength, and wherein said step of positioning at least one actuator includes positioning at least one actuator such that the actuator has a contact area with the structure that has a width of about a hundredth of the estimated source vibration wavelength.

7. The method of claim 1 wherein the source generates vibrations having multiple frequencies, and the at least one actuator vibrates with multiple frequencies.

8. A method for isolating vibrations from a source on a structure:
   modeling the structure as a beam having a portion for isolation by dividing the structure into nodes, and developing a pentadiagonal matrix representing displacements of the structure at each node responsive to vibrational loads provided at particular nodes of the structure;
   positioning a sensor proximate to the source;
   positioning at least one actuator on the structure between the source and the portion for isolation;
   receiving signals from the sensor at a controller;
   calculating vibrational inputs for each at least one actuator that will result in no vibration in the portion for isolation utilizing received signals from the sensor and the structure model by representing vibrations from the source as vibrations at a particular node, by representing vibrations from said at least one actuator as vibrations at a particular node, and utilizing the calculated pentadiagonal matrix to calculate vibrational inputs for each at least one actuator;
   providing driving signals responsive to the calculated vibrational inputs from the controller to each at least one actuator; and
   vibrating each at least one actuator in response to the first and second driving signals.

9. The method of claim 8 wherein the step of modeling the structure as a beam models the structure as a beam having a first end and a second end where each end is simply supported.

10. The method of claim 8 wherein the step of modeling the structure as a beam models the structure as a beam having at least one cantilevered end.

11. The method of claim 8 wherein the source includes multiple sources and the sensor includes multiple sensors with one sensor positioned at each of the multiple sources.

12. The method of claim 8 further comprising the step of estimating a source vibration wavelength, and wherein said step of positioning at least one actuator includes positioning at least one actuator such that the actuator has a contact area with the structure that has a width of about a hundredth of the estimated source vibration wavelength.

13. The method of claim 8 wherein the source generates vibrations having multiple frequencies, and the at least one actuator vibrates with multiple frequencies.

\* \* \* \* \*